(No Model.)
D. D. SKILES.
PLOW.
No. 315,351. Patented Apr. 7, 1885.
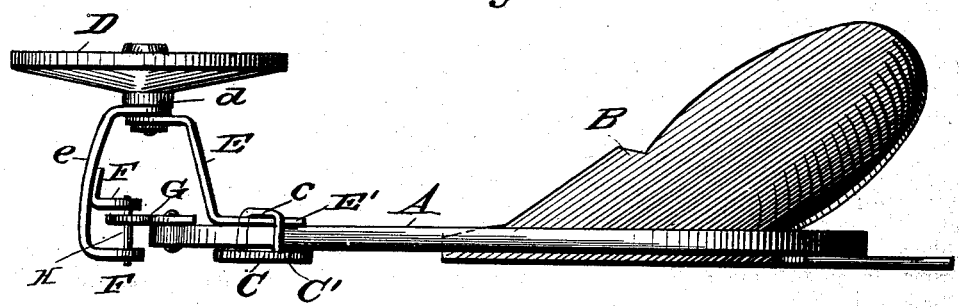
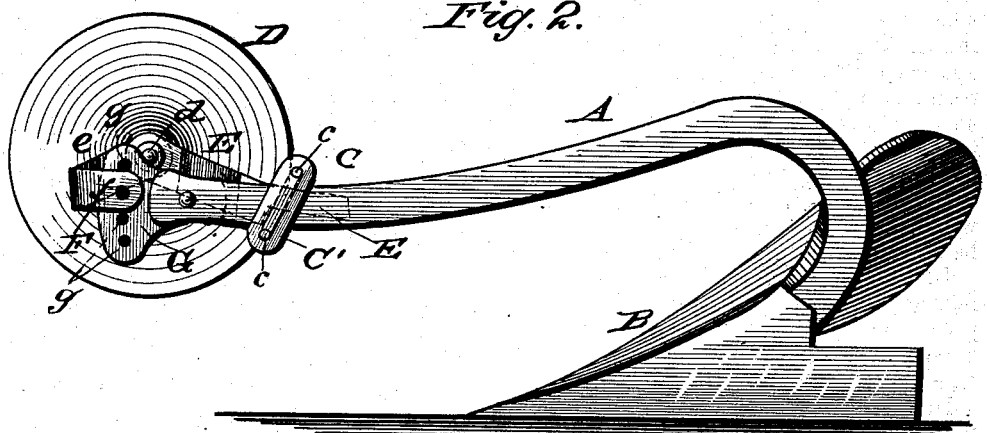
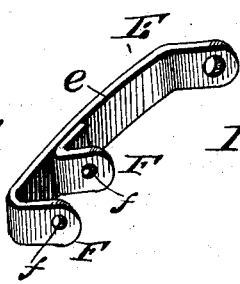
WITNESSES.
Phil C. Dietrich
V. E. Dowell
INVENTOR:
Danl. D. Skiles
By his Atty.
J. H. Alexander

UNITED STATES PATENT OFFICE.

DANIEL D. SKILES, OF EDNA MILLS, INDIANA.

PLOW.

SPECIFICATION forming part of Letters Patent No. 315,351, dated April 7, 1885.

Application filed January 16, 1885. (No model.)

*To all whom it may concern:*

Be it known that I, DANIEL D. SKILES, of Edna Mills, in the State of Indiana, have invented certain new and useful Improvements in Plows; and I do hereby declare that the following is a full, clear, and exact description thereof, reference being had to the accompanying drawings, and to the letters of reference marked thereon, which form part of this specification.

This invention relates to improvements in plows, its object being to provide means whereby the distance between any two adjacent furrows may be made the same, and whereby the same width of land may be turned over from each furrow.

The invention consists in attaching to a proper point of the plow-beam on the side opposite the landside a wheel having its inner surface beveled outward around the edge, so that when the plow-point is cutting a furrow it will stand with its said beveled surface against the land side of that furrow adjacent to the one being cut, and will thus cause the two furrows to be at all points the same distance apart, and all adjacent furrows equally distant from each other.

To suit different depths of furrows, the wheel is made vertically adjustable on the beam, as is hereinafter described.

In the drawings forming part of this specification, Figure 1 is a plan view of my improved plow attachment. Fig. 2 is a side elevation of the same. Fig. 3 shows perspective details of the same.

In the accompanying drawings, A represents the plow-beam having the point B attached in the desired manner.

C is a bracket surrounding the plow-beam and formed of a vertical plate, C', on the land side of the beam, and a vertical rod, c, joined by the ends thereto and on the furrow side of the beam.

D is the regulating-wheel, turning on a horizontal axis, d, which is secured to a support, E, the rear arm, E', of which has its end bent so as to be against the side of the plow-beam between the same and the rod c of the bracket. The front arm, e, of the support runs inward from the wheel and has at its end the two rearward projections, F F, parallel to the plow-beam and provided with the opposite holes f f.

G is a plate secured to the end of the plow-beam and standing between the projections E. The said plate is provided with the holes g g, arranged in a vertical arc of which the turning point of the rear arm, E', of the support E is the center. It is evident that by means of the holes f and g and a securing-pin, H, the wheel can be adjusted to different heights on the plow-beam. If desired, the rear arm, E', of the support E may be pivoted upon the side of the plow-beam, instead of being held thereto by the rod c of the bracket C.

When the machine is in operation, the beveled side of the regulating-wheel holds to and turns against the land side of the furrow adjacent to the one being cut, and keeps the latter at all points equally distant from the former. The edge of the regulating-wheel is not intended to touch the bottom of the furrow and has no function in regard to the depth of the same; but by the described means it may be adjusted to different heights, so as to take more or less hold of the side of the furrow.

Having described my invention, I claim—

The combination of the beam A, point B, bracket C, and plate G, provided with the holes g, of the beveled regulating-wheel D, turning on the axis d, support E, composed of the arms E' and e, projections F, provided with holes f, and pin H, substantially as specified.

In testimony that I claim the foregoing as my own I affix my signature in presence of two witnesses.

DANIEL D. SKILES.

Witnesses:
W. T. BRANSTRUP,
RELIEF JACKSON.